United States Patent [19]

Ito et al.

[11] 4,256,856

[45] Mar. 17, 1981

[54] COMPONENTS OF URANIUM ENRICHMENT PLANT

[75] Inventors: Masayuki Ito; Giro Okamoto; Sueo Machi, all of Takasaki; Kenzo Shirayama, Niihama, all of Japan

[73] Assignees: Japan Atomic Energy Research Institute, Tokyo; Sugimoto Chemical Co. Ltd., Osaka, both of Japan

[21] Appl. No.: 825,539

[22] Filed: Aug. 15, 1977

[30] Foreign Application Priority Data

Aug. 20, 1976 [JP] Japan .................................. 51-99372

[51] Int. Cl.³ ...................... C08F 8/00; C08F 210/02; C08F 214/28
[52] U.S. Cl. ................................ 525/331; 204/159.2; 525/345; 526/245; 526/249; 526/254
[58] Field of Search ............... 526/245, 249, 254, 253; 204/159.2; 525/331, 345

[56] References Cited

U.S. PATENT DOCUMENTS

| | | | |
|---|---|---|---|
| 2,549,935 | 4/1951 | Sauer | 526/254 |
| 3,720,655 | 3/1973 | Chandrasekaran | 526/253 |
| 3,817,951 | 6/1974 | Robinson | 526/254 |
| 4,076,929 | 2/1978 | Dohany | 526/253 |

*Primary Examiner*—Harry Wong, Jr.
*Attorney, Agent, or Firm*—Browdy and Neimark

[57] ABSTRACT

A cross-linked product of ethylene-hexafluoropropylene copolymer is a good elastic material and has excellent resistance to attack by uranium hexafluoride even at a high temperature. Components made of said copolymer exhibit surprisingly long life, when used in a uranium enrichment plant.

18 Claims, No Drawings

COMPONENTS OF URANIUM ENRICHMENT PLANT

The present invention relates to a component of a uranium enrichment plant. More particularly, the present invention relates to a component of a uranium enrichment plant such as a packing, a lining, a shock-absorbing member and the like, which consists essentially of an ethylene-hexafluoropropylene copolymer.

One of the typical conventional processes heretofore employed for the enrichment of uranium from uranium ores comprises a step of reacting the uranium ores with fluorine at a high temperature to provide uranium hexafluoride ($UF_6$) which is a volatile compound to be collected in the form of a vapor. Uranium hexafluoride thus collected generally consists of uranium-238 ($^{238}U$) which constitutes the major part of natural uranium, and the uranium compound thus collected contains therein, as natural uranium usually does, uranium-235 ($^{235}U$) which is the most important nuclide as a reactor fuel. Accordingly, if $^{235}U$ is wanted, it is necessary to separate it from uranium hexafluoride, which is a gaseous mixture of $^{238}UF_6$ and $^{235}UF_6$. The "gaseous diffusion" method has been industrially employed heretofore for this purpose. Recently, however, as the nuclear industry grows more and more promising, processes which are industrially more advantageous have been searched for, and as a result the "centrifuge process" has been developed. This process is basically the application of centrifugal force to the separation of mixed isotopes each having different mass. The centrifuge process is generally carried out by using high speed centrifuge which naturally requires proper shock-absorbing components. In addition, since uranium hexafluoride ($UF_6$) is a gaseous compound, the apparatus to be used in such process has to be completely airtight and accordingly a proper packing or sealant is also required. Further, uranium hexafluoride ($UF_6$) has a tendency to react with various organic materials to convert to uranium tetrafluoride ($UF_4$) with the release of hydrofluoric acid and this is accompanied by the deterioration of said organic materials. This is how shock-absorbing members and packings, etc. of a uranium enrichment plant are attacked and the characteristic properties of them are lost. By the term "shock-absorbing member", we mean a component for absorbing not only shock but also vibration. For these reasons, novel organic materials which are not attacked by uranium hexafluoride have long been desired.

The present inventors have long been studying to find organic materials which have satisfactory anti-$UF_6$ properties and also meet all other requirements. However, the goal was not easy to reach. For example, polymers derived from ethylene tetrafluoride have good resistance to attack by uranium hexafluoride, but they lack elastic properties. Thus, they are not usable as a packing, a shock-absorbing member and the like. Fluorine-containing ethylene copolymers such as ethylene-tetrafluoroethylene copolymer, ethylene-monochlorotrifluoroethylene copolymer, etc. are known as heat-resisting resins, but they also lack elastic properties and are not usable for the purpose mentioned above. The usability of fluorine-containing type elastic materials containing no ethylene component such as, for example, vinylidene fluoride-hexafluoropropylene copolymer, vinylidene fluoride-hexafluoropropylene-tetrafluoroethylene terpolymer and the like has also been examined, and as a result, it has been confirmed that though they are usable as a packing and a shock-absorbing member, they do not have satisfactory resistance to attack by uranium hexafluoride.

In view of these drawbacks inherent in prior art resins and elastic materials, the present inventors made a large number of studies and finally found a material which is suitable for use as a component of a uranium enrichment plant. Based on such discovery, the present invention has been accomplished.

That is, the main object of the present invention is to provide a novel component of a uranium enrichment plant which comprises a cross-linked product of ethylenepropylene hexafluoride copolymer. The novel components of the present invention are made of the cross-linked ethylene-hexafluoropropylene copolymer and can be characterized in that they exhibit remarkable resistance to attack by uranium hexafluoride even at high temperatures.

The copolymers of the present invention include not only a cross-linked ethylene-propylene hexafluoride copolymer but also a cross-linked terpolymer of ethylene, hexafluoropropylene and another ethylenically unsaturated monomer. Such polymers can be prepared by various processes. A typical process is one in which ethylene and hexafluoropropylene or in some cases mixture of said two monomers and another ethylenically unsaturated monomer are polymerized in the presence of a free radical initiator at a pressure in the range of 40–4,000 kg/cm² and at a temperature in the range of 40°–300° C. In other typical processes polymerization is carried out in the presence of additives such as ethane propane, an olefin such as propylene, an aliphatic propane, an aldehyde and the like; other processes are an emulsion polymerization process, which may generally be carried out at relatively lower pressures, a suspension polymerization process, an irradiation-induced polymerization by means of gamma-rays and the like.

The hexafluoropropylene content of the end product of the present invention may be varied depending on the desired performances of the end product to be used as a component of a uranium enrichment plant. Generally, however, those which have a hexafluoropropylene content in the range of 10–50% by mole are preferred copolymers having both high elastic properties and good resistance to attack by uranium hexafluoride.

As mentioned above, a cross-linked terpolymer of ethylene, hexafluoropropylene and another ethylenically unsaturated monomer can also be used in the practice of the present invention. Examples for such ethylenically unsaturated monomers are methyl, ethyl, n-propyl and n-butyl acrylates and methacrylates, vinyl polyfluoroacetate, vinylidene fluoride, 1,1,2-trichloroethylene, 1,1,2-trifluoroethylene, tetrafluoroethylene, 1,1-chlorofluoroethylene, 1,2-difluoroethylene, 1,1-dichloro-2-fluoroethylene, trifluorochloroethylene and the like.

The proportion of said ethylenically unsaturated monomer in the terpolymer is generally in the range of 0–50% by mole, the proportion of hexafluoropropylene in the same is in the range of 10–50% by mole and the balance is ethylene.

The copolymers which can be used as components of a uranium enrichment plant according to the present invention are generally those having a melt index (M.I.) in the range of 1–300 (determined at a load of 2.16 kg).

The ethylene-hexafluoropropylene copolymers according to the present invention are generally subjected to cross-linking treatment before they are put to use as a packing, a lining, a shock-absorbing member and the like as component of a uranium enrichment plant. Useful cross-linking processes for the purpose include a process comprising the addition of an organic peroxide, a process by means of electron beam irradiation and the like. The term "organic peroxide" herein used means an organic compound having a bond of —O—O— in its molecule. Typical examples of such compounds include the compounds having the following generic formulas:

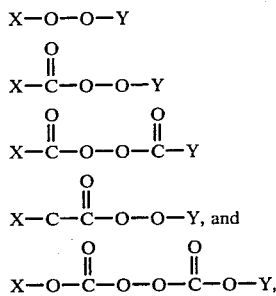

wherein X represents an alkyl group, an aralkyl group and a group derived therefrom; Y represents an alkyl group, an aralkyl group, a group derived therefrom, and hydrogen, wherein X and Y can be either the same or different. Representative examples of compounds of these types include ketone peroxide, peroxy ketal and the like.

The amount of the organic peroxide to be added is in the range of 0.1-10 parts by weight per 100 parts by weight of a fluorine-containing ethylene copolymer. When the amount added is 0.1 part by weight or less on the same standard as mentioned above, the degree of cross-linking is below the desired level. The addition of more than 10 parts by weight based on the same standard is almost of no use, because in such a case the degree of cross-linking reaches a saturation point and therefore it is disadvantageous from an economic viewpoint. The addition in the range of 1-7 parts by weight based on the same standard as mentioned above is most preferred.

The cross-linking treatment of ethylene-hexafluoropropylene copolymers is carried out by using a conventional rubber processing unit. That is, the copolymers are kneaded in a rolling mill or Banbury mixer before their first cross-linking is carried out in a press or the like and the second cross-linking in an oven. The first cross-linking is carried out at a temperature in the range of 140°-180° C. for 10-50 minutes and the second cross-linking at a temperature in the range of 190°-220° C. for 0.5-24 hours.

The term "ionizing radiation" herein used means gamma-rays, X-rays, beta-rays, alpha-rays, electron beams and the like. Among those, gamma-rays and electron beams are particularly advantageous in the practice of the present invention.

The irradiation dose is generally in the range of 1-50 Mrads, preferably in the range of 5-30 Mrads. The dose rate generally employed is in the range of $10^3$-$10^{10}$ rads/hr, more preferably in the range of about $10^4$-$10^9$ rads/hr.

The components of the present invention to be used in a uranium enrichment plant can be prepared by applying heat or ionizing radiation to powdered, or particulate, or molded raw material comprising ethylene-hexafluoropropylene copolymer optionally containing proper fillers. Said molded material may be a film, a sheet, a pipe, a rod, or sometimes an O-ring, a lining and the like.

In addition to the organic peroxide materials mentioned above, a number of various compounding additives selected from acid-acceptors such as magnesium oxide, lead oxide, zinc oxide, calcium oxide, etc.; inorganic fillers such as carbon black, plasticizers; stabilizers and the like can also be added to the ethylene-hexafluoropropylene copolymers of the present invention. Polyfunctional monomers can also be added thereto as a modifier. Namely, the present invention can be summarized as follows.

Uranium enrichment plants for producing enriched uranium for use as a reactor fuel generally require various components made of an elastic material which has good resistance to attack by uranium hexafluoride at a high temperature. Examples of such components include a packing, a shock-absorbing member and the like. Heretofore, no proper elastic material has been found which satisfies all such requirements as mentioned above. Thus, the only countermeasure to the problem of $UF_6$ attack has been to change such component parts as often as necessary, a temporary and unsatisfactory solution.

In a series of investigations with respect to high polymer elastic materials having improved chemical and heat resistances, the present inventors have carefully examined the mutual action and reactivity between various elastic materials and uranium hexafluoride. As a result, they have discovered that an elastic material prepared by cross-linking a copolymer consisting of ethylene and hexafluoropropylene has remarkably superior resistance to attack by uranium hexafluoride as well as acceptable resistance to high temperatures and acceptable elasticity as compared with any other elastic material and accordingly is very suitable as a component of a uranium enrichment plant. Based on such discovery, the present inventors have accomplished the present invention.

The present invention will be explained in more detail by the following examples. But, it will be understood that these examples are given here only to illustrate and not to limit the invention.

EXAMPLES 1-3

Each of three different ethylene-hexafluoropropylene copolymers containing different fractions of hexafluoropropylene was molded into a sheet 1.0 mm thick, to the surface of which a sheet of Mylar film was closely adhered to shut off air. Then, the film was subjected to electron beam irradiation from an electron beam accelerator for a dose of 12 Mrads to cross-link the copolymer. A dumbbell specimen of ASTM-D-1822, Type-L was cut out of each cross-linked copolymer film. Each specimen was placed in an about 1000 ml (internal volume)-stainless steel vessel, which was deaerated by vacuum before gaseous uranium hexafluoride was introduced thereto. Heat was applied to keep the gaseous $UF_6$ at 100° C. and at a pressure of 500 mmHg for 7 days. Then, the temperature was lowered and the $UF_6$ gas was removed before the vessel was opened to take the specimen out of it. The weight difference before and after the experiment was examined and a tensile test was carried out to determine the change in the mechanical strength. The results of these experiments are summarized in Table 1. As is obvious from this table, the novel component of the present invention made of ethylene-hexafluoropropylene copolymer is not substantially attacked by uranium hexafluoride even at 100° C. No substantial decrease in the tensile strength was observed after the experiment. In contrast, the result of comparative experiment carried out under the same conditions except that a conventional fluororubber (vinylidene fluoride-hexafluoropropylene copolymer) available in the market was used instead of the copolymer of the present invention showed that a remarkable weight increase due to the formation of solid uranium tetrafluoride in the test sample of fluororubber was observed and the mechanical strength of the sample remarkably decreased. Thus, the superiority of the material of the present invention was clearly demonstrated.

TABLE 1
(Results of Examples 1-3)

| | Conditions for preparing samples | | |
|---|---|---|---|
| | Composition of elastic raw materials (% by weight) | | Dose for cross-linking |
| Example No. | Hexafluoropropylene | Ethylene | (Mrads) |
| 1 | 52 | 48 | 12 |
| 2 | 62 | 38 | 12 |
| 3 | 70 | 30 | 12 |

Experiments for checking resistance to attack by uranium hexafluoride (by exposing a specimen to 100° C., 500 mmHg for 7 days)

| | | Results of tensile test (Value after exposure based on 100* (%) | | |
|---|---|---|---|---|
| Example No. | Weight increase (%) | Tensile strength | Extension at break | Modulus at 100% elongation |
| 1 | 0.3 | 97 | 98 | 100 |
| 2 | 0.2 | 100 | 100 | 100 |
| 3 | 0 | 100 | 100 | 100 |
| Comparative example (market fluororubber) | 57.9 | 51 | 30 | — |

*providing the value before exposure is 100)

EXAMPLES 4-6

The same copolymers as those used in Examples 1-3 were used but cross-linking of them was carried out by using an organic peroxide (tertiarybutyl peroxybenzoate) instead of radiation. In particular, 3 parts by weight of tertiarybutyl peroxybenzoate and 2.5 parts by weight of triallyl isocyanurate were mixed with 100 parts by weight of the raw material copolymer to knead them well with one another before the mixture was pressed at 150° C. for 40 minutes to carry out both cross-linking and molding into the form of a sheet, simultaneously. Then, a dumbbell specimen was cut out of the molded sheet. The resistance against gaseous uranium hexafluoride and the mechanical strength of each specimen were examined in the same manner as mentioned in Examples 1-3. The results of these experiments are summarized in Table 2. As is obvious from this table, the material of the present invention prepared by cross-linking by chemical means is of superior quality and is not substantially attacked by uranium hexafluoride even at a temperature as high as 100° C.

TABLE 2
(Results of Examples 4-6)

| | Conditions under which specimens were prepared | | | |
|---|---|---|---|---|
| | Compositions of elastic raw materials (% by weight) | | Organic peroxide (tertiarybutyl peroxybenzoate) | triallyl isocyanurate (parts by weight) |
| Example No. | Hexafluoropropylene | Ethylene | | |
| 4 | 52 | 48 | 3 | 2 |
| 5 | 62 | 38 | 3 | 2 |
| 6 | 70 | 30 | 3 | 2 |

Experiments for checking resistance to attack by uranium hexafluoride (by exposing a specimen to 100° C., 500 mmHg for 7 days)

| | | Results of tensile test Value after exposure based on 100 (%)* | | |
|---|---|---|---|---|
| Example No. | Weight increase (%) | Tensile strength | Extension at break | Modulus at 100% elongation |
| 4 | 0.6 | 95 | 96 | 100 |
| 5 | 0.6 | 95 | 97 | 100 |
| 6 | 0.5 | 97 | 97 | 100 |
| Comparative example (market fluororubber) | 57.9 | 51 | 30 | — |

*providing the value before exposing is 100.

EXAMPLES 7-9

The same copolymers as those used in Examples 1-3 were used as raw materials but cross-linking was carried out by using an organic peroxide (tertiary peroxybenzoate). Carbon (MT carbon) was used as a filler as is usually employed in the conventional rubber making process, and lead oxide or magnesium oxide or both of them were used as an acid-acceptor added to the raw materials. In particular, 20 parts by weight of MT carbon, 3.7 parts by weight of tertiary butyl peroxybenzoate, 2.5 parts by weight of triallyl isocyanurate, 15 parts by weight of magnesium oxide and 10 parts by weight of lead oxide (this compound was used only in Example 9) were added to 100 parts by weight of the copolymer as a raw material to knead them well with one another and the resulting mixture was pressed at 150° C. for 40 minutes to carry out both cross-linking and molding at the same time to obtain a molded product in the form of a sheet. Then, a dambbell specimen was cut out of the molded sheet. Tests for checking the resistance against gaseous uranium hexafluoride and the mechanical strength of each specimen were carried out in the same manner as stated in Examples 1-3. The results of these tests are summarized in Table 3. As is obvious from this table, the material obtained was of excellent quality and is not substantially attacked by uranium hexafluoride even at a temperature as high as 100° C.

TABLE 3
(Results of Examples 7-9)

| | Conditions under which specimens were prepared | | | | | |
|---|---|---|---|---|---|---|
| | Compositions of elastic raw materials (% by weight) | | Organic peroxide (tertiary-butyl peroxy | Triallyl isocyanurate (parts by | MT carbon (parts by | Magnesium oxide (parts by | Lead oxide (parts by |
| Example | Hexafluoro- | | | | | | |

TABLE 3-continued (Results of Examples 7-9)

| No. | propylene | Ethylene | benzoate) | weight) | weight) | weight) | weight) |
|-----|-----------|----------|-----------|---------|---------|---------|---------|
| 7   | 53        | 47       | 3.7       | 2.5     | 20      | 15      | 0       |
| 8   | 20        | 80       | 3.7       | 2.5     | 20      | 15      | 0       |
| 9   | 53        | 47       | 3.7       | 2.5     | 20      | 15      | 10      |

Experiments for checking resistance to attack by uranium hexafluoride
(by exposing a specimen to 100° C., 500 mmHg for 7 days)

| Example No. | Weight increase (%) | Results of tensile test Value after exposure based on 100 (%)* | | |
|---|---|---|---|---|
| | | Tensile strength | Extension at break | Modulus at 100% |
| 7 | 6.5 | 95 | 90 | 100 |
| 8 | 5.1 | 100 | 90 | 90 |
| 9 | 7.4 | 95 | 70 | 80 |
| Comparative example (market fluororubber) | 57.9 | 51 | 30 | — |

*providing value before exposure is 100.

What we claim is:

1. In a uranium enrichment plant containing a component of a device, the improvement wherein said component is formed of a cross-linked elastic copolymer of ethylene and hexafluoropropylene prepared by cross-linking a copolymer of ethylene and hexafluoropropylene containing 10 to 50% by mole of hexafluoropropylene and having a melt index before cross-linking in the range of 1 to 300 determined at a load of 2.16 kg.

2. A device as defined in claim 1, wherein the cross-linked copolymer is prepared by adding 0.1 to 10 parts by weight of an organic peroxide to 100 parts by weight of a copolymer of ethylene and hexafluoropropylene containing 10 to 50% by mole of hexafluoropropylene and having a melt index in the range of 1 to 300 measured at a load of 2.16 kg, followed by heating the resulting copolymer composition to bring about cross-linking.

3. A device as defined in claim 2, wherein said heating step is carried out in two stages comprising the first stage which is carried out at a temperature in the range of 140°–180° C. for 10–50 minutes and the second stage which is carried out at a temperature in the range of 190°–220° C. for 0.5 to 24 hours.

4. A device as defined in claim 1, wherein the cross-linked copolymer is prepared by subjecting a copolymer of ethylene and hexafluoropropylene containing 10 to 50% by mole of hexafluoropropylene and having a melt index in the range of 1 to 300 measured at a load of 2.16 kg to an ionizing radiation.

5. A device as defined in claim 4, wherein the ionizing radiation treatment is carried out by making use of a radiation source selected from the group consisting of gamma-rays, X-rays, beta-rays, alpha-rays and electron beams.

6. A device as defined in claim 4, wherein the ionizing radiation source is selected from the group consisting of gamma-rays and electron beams.

7. A device as defined in claim 6, wherein the irradiation is carried out at a dose rate in the range of $10^3$–$10^{10}$ rads/hr for a total dose in the range of 1–50 Mrads.

8. A device as defined in claim 7, wherein the irradiation is carried out at a dose rate in the range of $10^4$–$10^9$ rads/hr for a total dose in the range of 5–30 Mrads.

9. A device as defined in claim 1, wherein said component is a packing or sealant.

10. A device as defined in claim 2, wherein said component is a packing or sealant.

11. A device as defined in claim 4, wherein said component is a packing or sealant.

12. A device as set forth in claim 1, wherein said component is a lining.

13. A device as set forth in claim 2, wherein said component is a lining.

14. A device as set forth in claim 4, wherein said component is a lining.

15. A device as set forth in claim 1, wherein said component is a shock-absorbing member.

16. A device as set forth in claim 2, wherein said component is a shock-absorbing member.

17. A device as set forth in claim 4, wherein said component is a shock-absorbing member.

18. A component of an uranium enrichment plant formed of a cross-linked elastic copolymer of ethylene and hexafluoropropylene prepared by cross-linking a copolymer of ethylene and hexafluoropropylene containing 10 to 50 mole percent of hexafluoropropylene and having a melt index before cross-linking in the range of 1–300 determined at a load of 2.16 kg.

* * * * *

UNITED STATES PATENT AND TRADEMARK OFFICE
CERTIFICATE OF CORRECTION

PATENT NO. : 4,256,856
DATED : March 17, 1981
INVENTOR(S) : ITO et al.

It is certified that error appears in the above-identified patent and that said Letters Patent are hereby corrected as shown below:

[73] Assignees, line 2, "Sugimoto Chemical" should read --Sumitomo Chemical--

Signed and Sealed this

Fourth Day of August 1981

[SEAL]

Attest:

GERALD J. MOSSINGHOFF

Attesting Officer — Commissioner of Patents and Trademarks